(12) United States Patent
Lee et al.

(10) Patent No.: US 10,890,800 B2
(45) Date of Patent: Jan. 12, 2021

(54) DISPLAY APPARATUS

(71) Applicant: SAMSUNG ELECTRONICS CO., LTD., Suwon-si (KR)

(72) Inventors: Young Chol Lee, Suwon-si (KR); Wook Jae Jeon, Suwon-si (KR); Nam Seok Roh, Suwon-si (KR); Kwan Sik Min, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/591,834

(22) Filed: Oct. 3, 2019

(65) Prior Publication Data

US 2020/0110304 A1  Apr. 9, 2020

(30) Foreign Application Priority Data

Oct. 5, 2018 (KR) .................... 10-2018-0119076

(51) Int. Cl.
*G02F 1/1335* (2006.01)
*G02F 1/13357* (2006.01)

(52) U.S. Cl.
CPC .. *G02F 1/133536* (2013.01); *G02F 1/133606* (2013.01); *G02F 2001/133607* (2013.01)

(58) Field of Classification Search
CPC ... G02F 1/133536; G02F 2001/133607; G02F 1/133606
See application file for complete search history.

(56) References Cited

U.S. PATENT DOCUMENTS

| 2010/0039704 | A1* | 2/2010 | Hayashi | G02F 1/133606 359/485.06 |
| 2011/0205734 | A1* | 8/2011 | Yamakita | G02F 1/133606 362/235 |
| 2014/0176850 | A1* | 6/2014 | Kim | F21V 15/04 349/58 |
| 2015/0301264 | A1* | 10/2015 | Min | G02B 6/0036 362/343 |
| 2016/0091750 | A1* | 3/2016 | Lien | G02F 1/133615 349/68 |
| 2016/0334078 | A1* | 11/2016 | Wang | G02B 5/3083 |
| 2017/0090241 | A1* | 3/2017 | Eo | G02B 6/0053 |
| 2017/0315403 | A1* | 11/2017 | Kashiwagi | G02B 6/0055 |

* cited by examiner

*Primary Examiner* — Michael H Caley
*Assistant Examiner* — Mariam Qureshi
(74) *Attorney, Agent, or Firm* — Sughrue Mion, PLLC

(57) ABSTRACT

A display apparatus includes a light emitting module to emit light; a first prism sheet provided on the light emitting module; a reflective polarizing sheet provided on the first prism sheet to transmit first polarized light of the light exiting the first prism sheet and reflect second polarized light of the light exiting the first prism sheet; a second prism sheet provided on the reflective polarizing sheet; and a liquid crystal panel provided on the second prism sheet, the liquid crystal panel including a liquid crystal cell, a first polarizing sheet provided on a first side the liquid crystal cell, and a second polarizing sheet provided between the second prism sheet and a second side of the liquid crystal cell, wherein the second prism sheet is configured to control a transmission angle at which the light exiting the reflective polarizing sheet is transmitted by the liquid crystal cell.

18 Claims, 8 Drawing Sheets

DISPLAY APPARATUS

CROSS-REFERENCE TO RELATED APPLICATION(S)

This application is based on and claims priority under 35 U.S.C. § 119 to Korean Patent Application No. 10-2018-0119076, filed on Oct. 5, 2018, in the Korean Intellectual Property Office, the disclosure of which is incorporated by reference herein in its entirety.

BACKGROUND

1. Field

The disclosure relates to a display apparatus having a liquid crystal panel, and more particularly, to a display apparatus including a prism sheet to improve display quality.

2. Description of Related Art

A display apparatus is a type of an output apparatus that visually displays data information such as characters and graphics, and images or the like.

A liquid crystal display (LCD) is a type of display apparatus, in which liquid crystal is injected between two substrates on which electrodes are formed, and an image is displayed by controlling the intensity of a voltage applied to the electrodes.

The liquid crystal display includes a backlight unit for providing light to a liquid crystal panel, and the backlight unit includes a light source, a light guide plate for converting the light emitted from the light source into a surface light source and guiding the surface light source to the liquid crystal panel, and a prism for condensing light emitted from the light guide plate.

Because the liquid crystal of the liquid crystal display has birefringence with different refractive indexes in the major axis direction and the minor axis direction of molecules, the smaller the transmission angle at which light passes through a liquid crystal layer, the more a desired image quality may be expressed.

SUMMARY

Provided is a display apparatus in which an angle at which light transmits through a liquid crystal layer may be controlled to improve image quality and secure a sufficient viewing angle.

In accordance with an aspect of the disclosure, there is provided a display apparatus including: a light emitting module configured to emit light; a first prism sheet provided on the light emitting module; a reflective polarizing sheet provided on the first prism sheet, the reflective polarizing sheet being configured to transmit first light of the light exiting the first prism sheet and reflect second light of the light exiting the first prism sheet, the first light having a first polarization and the second light having a second polarization different from the first polarization; a second prism sheet provided on the reflective polarizing sheet; and a liquid crystal panel provided on the second prism sheet, the liquid crystal panel including a liquid crystal cell, a first polarizing sheet provided on a first side the liquid crystal cell, and a second polarizing sheet provided between the second prism sheet and a second side of the liquid crystal cell opposite to the first side of the liquid crystal cell, wherein the second prism sheet is configured to control a transmission angle at which the light exiting the reflective polarizing sheet is transmitted by the liquid crystal cell.

The first polarizing sheet may include a diffusion layer and a polarizer layer provided between the liquid crystal cell and the diffusion layer, the diffusion layer being configured to diffuse the light exiting the polarizer layer.

The first prism sheet may include a first base sheet and a first prism pattern formed on a first surface of the first base sheet facing the reflective polarizing sheet.

The first prism pattern may include a plurality of first prisms, and each first prism from among the plurality of first prisms may have a triangular cross section and extend along a longitudinal direction of the display apparatus.

The first prism sheet may further may include a second prism pattern formed on a second surface of the first base sheet opposite to the first surface of the first base sheet.

The second prism pattern may include a plurality of second prisms, and each second prism from among the plurality of second prisms may have a triangular cross section and extends along a width direction of the display apparatus.

The second prism sheet may include a second base sheet and a third prism pattern formed on a first surface of the second base sheet facing the liquid crystal panel.

The third prism pattern may include a plurality of third prisms, and each third prism from among the plurality of third prisms may have a triangular cross section and extends along a width direction of the display apparatus.

A vertical angle of the third prism pattern may be an obtuse angle.

The second prism sheet may include a plurality of second prism sheets laminated in a vertical direction.

One of the plurality of second prism sheets may include prisms having different heights from each other so that the plurality of second prism sheets are laminated together.

A first one of the plurality of second prism sheets may be joined to a second one of the plurality of second prism sheets, the first one of the plurality of second prism sheets may include a first prism having a first height and a second prism having a second height lower than the first height, and an end of the first prism may be adhered to a surface of the second one of the plurality of second prism sheets and an end of the second prism may not be adhered to the surface of the second one of the plurality of second prism sheets.

The second prism sheet may be joined to a surface of the reflective polarizing sheet.

The display apparatus may further include a quantum dot sheet disposed between the light emitting module and the first prism sheet.

In accordance with an aspect of the disclosure, there is provided a display apparatus including: a light emitting module configured to emit light; a reflective polarizing sheet provided on the light emitting module, the reflective polarizing sheet being configured to transmit first light of the light emitted from the light emitting module and reflect second light emitted from the light emitting module, the first light having a first polarization and the second light having a second polarization different from the first polarization; a prism sheet provided on the reflective polarizing sheet and the liquid crystal panel; and a liquid crystal panel provided on the second prism sheet, the liquid crystal panel including a liquid crystal cell, a first polarizing sheet provided on a first side the liquid crystal cell, and a second polarizing sheet provided between the second prism sheet and a second side of the liquid crystal cell opposite to the first side of the liquid crystal cell, wherein the prism sheet is configured to control a transmission angle at which the light exiting the reflective polarizing sheet is transmitted by the liquid crystal cell, and wherein the first polarizing sheet includes a diffusion layer configured to diffuse light exiting the liquid crystal cell.

The prism sheet may include a base sheet and a prism pattern formed on a surface of the base sheet facing the reflective polarizing sheet.

The prism pattern may include a plurality of prisms, and each prism from among the plurality of prisms may have a triangular cross section and extends along a width direction of the display apparatus.

A vertical angle of the prism pattern may be an obtuse angle.

The prism sheet may include a plurality of the prism sheets laminated in a vertical direction.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
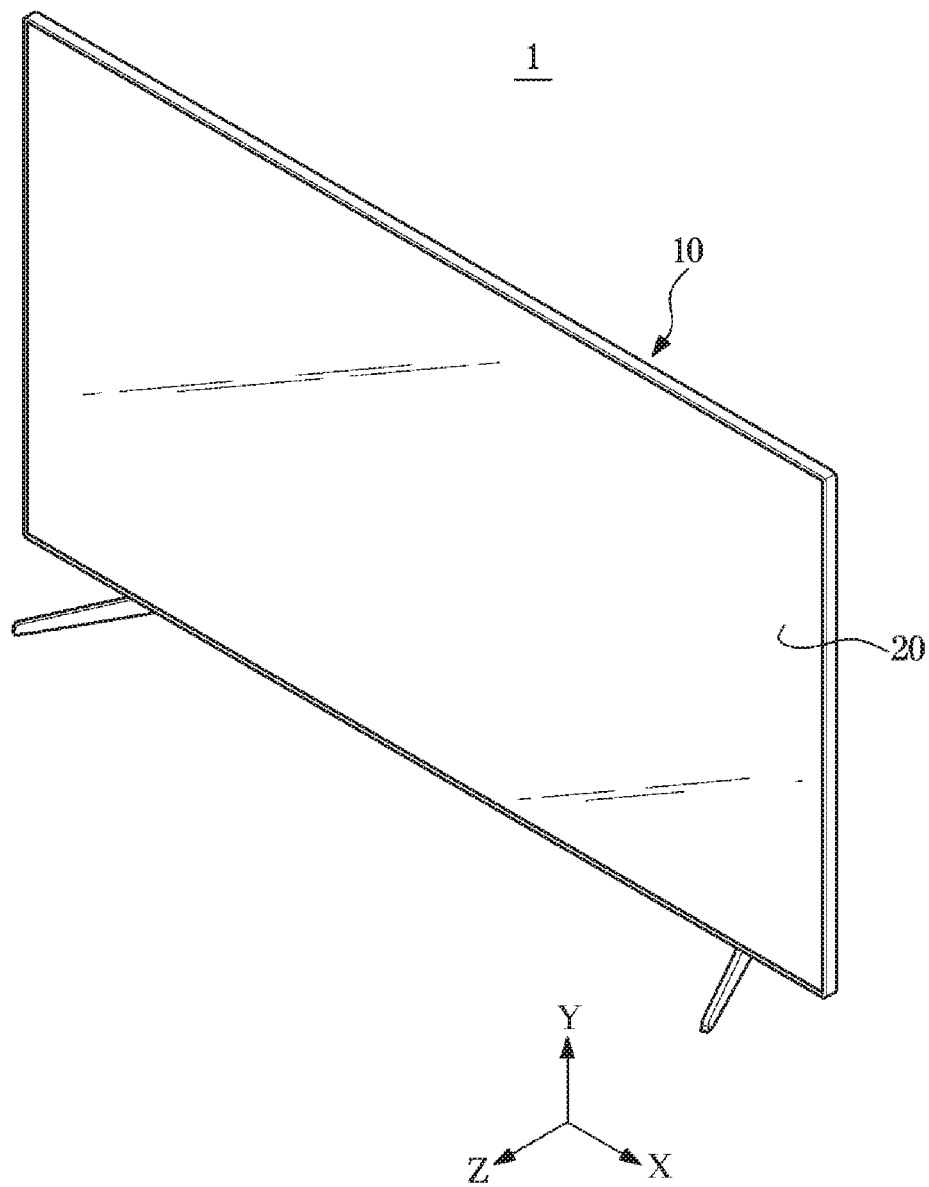
FIG. 1 is a view illustrating a display apparatus according to an embodiment.

The embodiments described herein and the configurations shown in the drawings are only examples of embodiments of the disclosure, and various modifications may be made at the time of filing of the disclosure to replace the embodiments and drawings of the present specification.

The singular representation used in the description may include plural representations unless the context clearly dictates otherwise.

It is to be understood that the terms "comprises," "include," and "has" are intended to indicate that there are features, numbers, steps, operations, elements, parts, or combinations thereof described in the specification, and do not exclude the presence or addition of one or more other features, numbers, steps, operations, elements, parts, or combinations thereof.

Hereinafter, embodiments according to the disclosure will be described in detail with reference to the accompanying drawings.

An X-axis direction, a Y-direction, and a Z-axis direction are shown in the drawings, the X-axis direction indicates a longitudinal direction of the display apparatus, the Y-axis direction indicates a width direction of the display apparatus, and the Z-axis direction indicates a direction perpendicular to the X-axis and Y-axis directions. The vertical relationship between the components is based on the Z axis.

Figure 2:
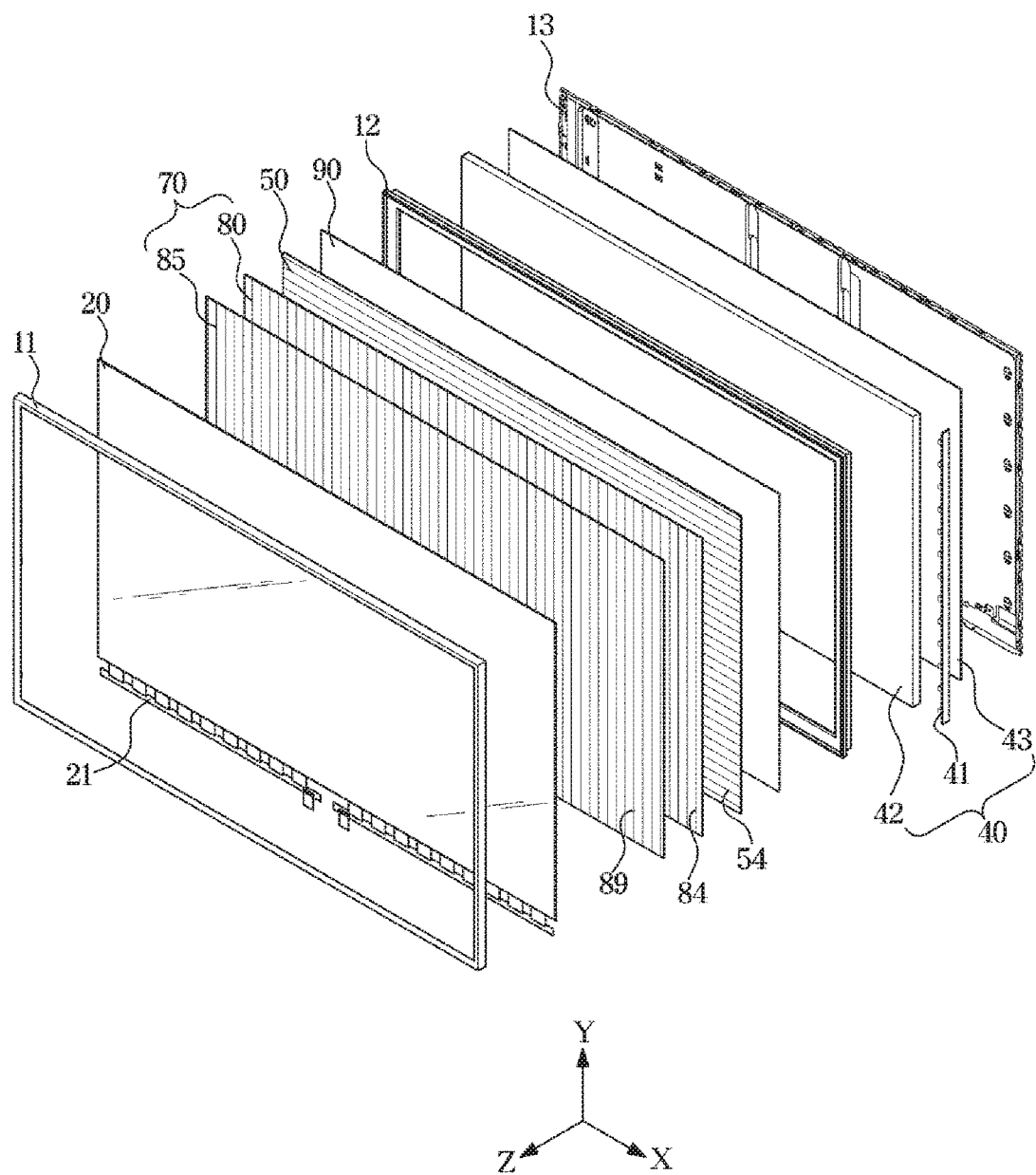
FIG. 2 is an exploded perspective view of the display apparatus according to an embodiment.
Figure 3:
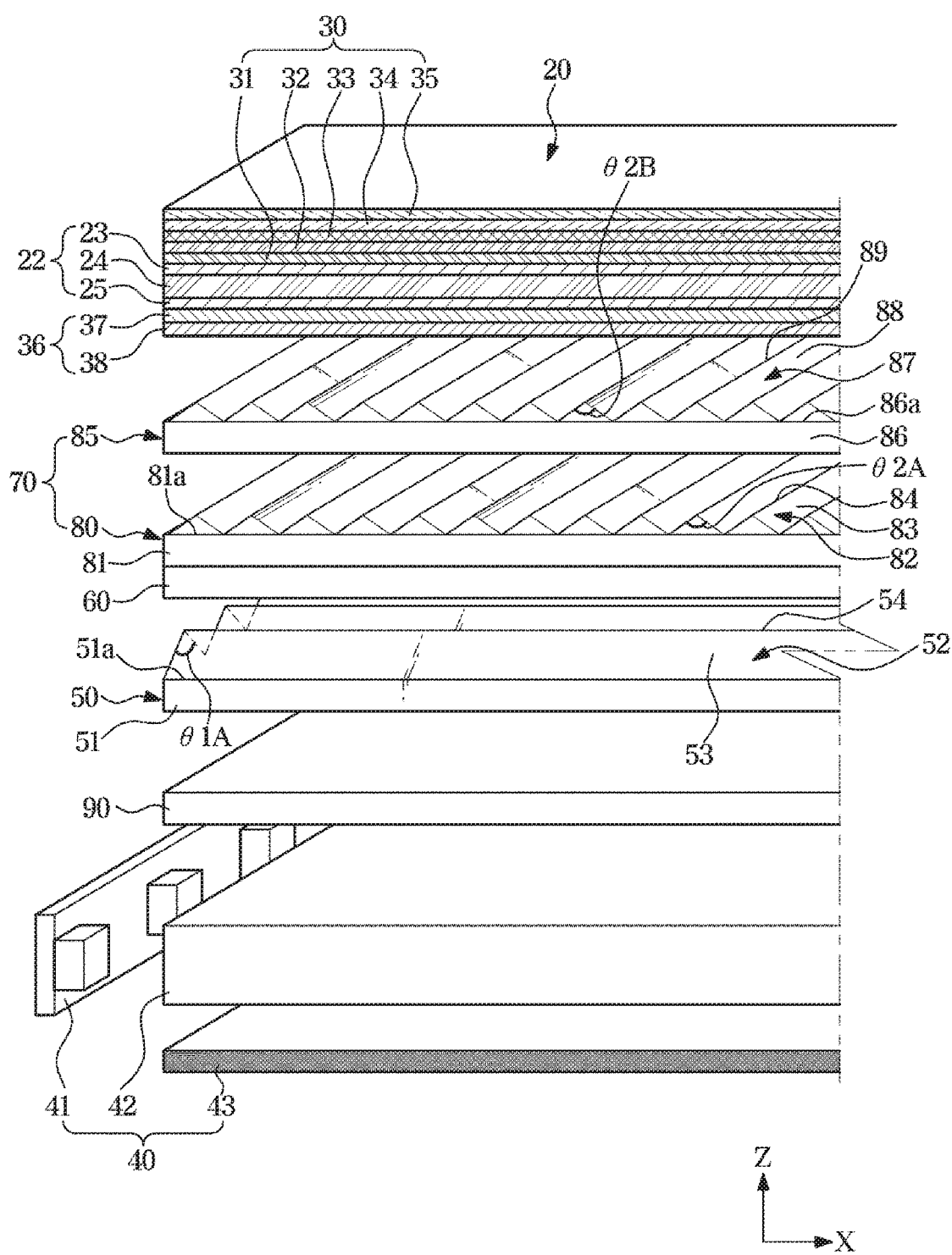
FIG. 3 is a view illustrating a laminated structure of the display apparatus according to an embodiment.

FIG. 1 is a view illustrating a display apparatus according to a embodiment. FIG. 2 is an exploded perspective view of the display apparatus according to the embodiment. FIG. 3 is a view illustrating a laminated structure of the display apparatus according to the embodiment A display apparatus 1 may process an image signal received from an external source and visually display the processed image. Hereinafter, the case where the display apparatus 1 is a television (TV) is exemplified, but embodiments are not limited thereto. For example, the display apparatus 1 may be implemented in various forms such as a computer monitor, a portable multimedia apparatus, a portable communication apparatus, and the like, and the form of the apparatus is not limited as long as it is an apparatus for visually expressing an image.

The display apparatus 1 includes a chassis assembly 10 that accommodates various components and a liquid crystal panel 20 that displays an image for the user to recognize. A light emitting module 40 for providing light to the liquid crystal panel 20, a quantum dot sheet 90 and various optical sheets 50, 60 and 70 may be provided inside the chassis assembly 10 as shown, e.g., in FIG. 3.

As shown, e.g., in FIG. 2, the chassis assembly 10 may include a top chassis 11 provided at an upper portion of the display apparatus 1, a bottom chassis 13 provided at a lower portion of the display apparatus 1, and a middle mold 12 provided between the top chassis 11 and the bottom chassis 13.

The top chassis 11 is provided on a surface of the liquid crystal panel 20 on which an image is displayed and may support a rim portion of the liquid crystal panel 20. The bottom chassis 13 may be provided on the opposite surface of the surface of the liquid crystal panel 20 on which an image is displayed, and prevent various components included in the display apparatus 1 from being exposed to the outside and protect the various components from external impacts. The middle mold 12 may fix the liquid crystal panel 20, the quantum dot sheet 90, the various optical sheets 50, 60 and 70, and the light emitting module 40 to the top chassis 11 and the bottom chassis 13.

The liquid crystal panel 20 may display various images according to image signals input from an external source. The liquid crystal panel 20 may be a non-light emitting display panel that generates an image by reflecting, transmitting, or blocking the light emitted from the light emitting module 40.

The liquid crystal panel 20 may include a liquid crystal cell 22, an upper polarizing sheet 30 formed above the liquid crystal cell 22, and a lower polarizing sheet 36 formed below the liquid crystal cell 22 as shown in FIG. 3.

The liquid crystal cell 22 may include a liquid crystal layer 24 and a pair of transparent substrates 23 and 25 formed above and below the liquid crystal layer 24, respectively. A liquid crystal is a substance in an intermediate state between a crystal and a liquid. The liquid crystal may exhibit optical properties depending on a change in voltage. For example, the direction of the arrangement of the molecules constituting the liquid crystal may change depending on a change of the applied electric field.

On opposite sides of the liquid crystal layer 24, a pair of transparent electrode layers for forming an electric field in the liquid crystal layer 24 may be provided. The electric field applied to the liquid crystal layer 24 may vary depending on the voltage input to the pair of transparent electrode layers. The transparent electrode layer may include gate lines, data lines, and thin film transistors (TFT).

The gate lines may be arranged in the row direction to turn on or off the TFTs according to gate signals, and the data lines may be arranged in the column direction to transmit data signals to a plurality of pixels through the TFTs. As such, the electric field applied to the liquid crystal layer 24 changes according to the gate signals input through the gate lines and the data signals input through the data lines, and the molecular arrangement of liquid crystal may change with the change of the electric field. Further, the liquid crystal layer 24 may transmit or block light depending on the molecular arrangement of the liquid crystal.

The pair of transparent substrates 23 and 25 form an outer appearance of the liquid crystal cell 22 and may protect the liquid crystal layer 24 and the transparent electrode layers. The transparent substrates 23 and 25 may be made of a tempered glass or a transparent film having good light transmittance.

A driving circuit unit 21 (see, e.g., FIG. 2) may provide a driving signal for driving the liquid crystal panel 20 to the liquid crystal panel 20.

The upper and lower polarizing sheets 30 and 36, which transmit one polarized light (i.e., first light having a first polarization) and absorb the other one polarized light (i.e., second light having a second polarization), may be formed above and below the liquid crystal cell 22, respectively.

The upper polarizing sheet 30 may include a phase-difference layer 31, a polarizer layer 32, an intermediate layer 33, a diffusion layer 34, and a surface layer 35.

The phase-difference layer 31 may perform a function of changing linearly polarized light to circularly polarized light or changing the circularly polarized light to the linearly polarized light and may be in the form of a film formed of a polymer material.

The polarizer layer 32 may be formed above the phase-difference layer 31 and may be formed of polyvinyl alcohol (PVA). The polarizer layer 32 may transmit the light that vibrates in a specific direction among lights vibrating in various directions and absorb the lights that vibrate in the other directions. In other words, the polarizer layer 32 may transmit light having a certain polarization and absorb light having any other polarization.

Figure 4:
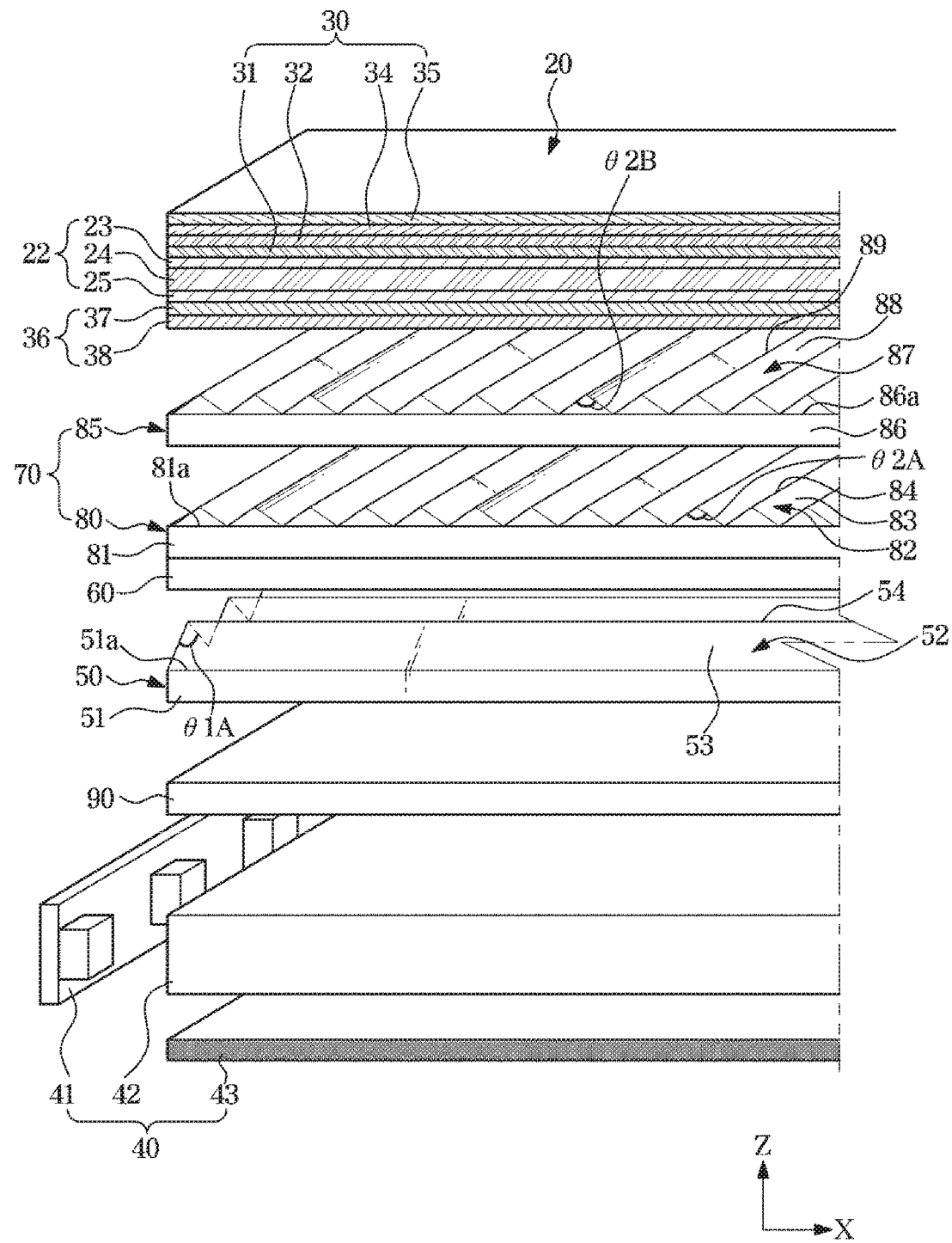
FIG. 4 is a view illustrating a laminated structure of a display apparatus according to an embodiment.

The intermediate layer 33 may be formed of the same material as the surface layer 35, which will be described later. The diffusion layer 34 and the surface layer 35 may be omitted and the intermediate layer 33 may serve as the surface layer 35 when the diffusion layer 34, which will be described later, is not required. As illustrated in FIG. 4, the intermediate layer 33 may be omitted.

The diffusion layer 34 may perform a function of spreading the light, which has passed through the liquid crystal layer 24 at a narrow viewing angle through the second prism sheet 70, which will be described later. Therefore, according to an embodiment, the diffusion layer 34 may perform a function of widening the viewing angle of the display apparatus 1. The diffusion layer 34 may be formed in an ultraviolet (UV) pattern using a UV curable resin material.

The surface layer 35 may be formed above the diffusion layer 34 to prevent the surface of the upper polarizing sheet 30 from being damaged.

The lower polarizing sheet 36 may include a polarizer layer 37 and a surface layer 38 formed below the polarizer layer 37.

The polarizer layer 37 of the lower polarizing sheet 36 may have a polarization direction perpendicular to the polarizer layer 32 of the upper polarizing sheet 30.

The light emitting module 40 is disposed below the liquid crystal panel 20 to generate light for the liquid crystal panel 20 to generate an image. The light emitting module 40 may be of an edge type in which a light source is located at a side thereof. However, the light emitting module 40 is not limited thereto but may be of a direct type in which the light source is positioned below the liquid crystal panel 20 (see, e.g., FIG. 8).

The light emitting module 40 may include a light source 41 for generating light, a light guide plate 42 for converting the light generated from the light source 41 into a sheet light, and a reflector sheet 43 provided below the light guide plate 42 to reflect the light emitted from the light guide plate 42.

The light source 41 is provided on a side surface of the light guide plate 42 to output light toward the light guide plate 42. The light source 41 may output light (monochromatic light) of a single wavelength (single color) or may output light (white light) of a plurality of wavelengths. Because the display apparatus 1 according to the disclosed embodiment includes the quantum dot sheet 90, a light source that outputs monochromatic light, particularly blue light having a short wavelength, may be used as the light source 41.

A light emitting diode (LED) or a cold cathode fluorescent lamp (CCFL) having a small calorific value may be employed as the light source 41.

The light guide plate 42 may emit light upward by changing the traveling direction of the light incident from the side surface thereof. In order to change the traveling direction of light, a plurality of convex streaks may be formed on an upper surface of the light guide plate 42 and a plurality of dots may be formed on a lower surface of the light guide plate 42. The light guide plate 42 may be formed of transparent and strong methyl methacrylate (PMMA) or transparent polycarbonate (PC).

The reflector sheet 43 is provided below the light guide plate 42 and may reflect a part of the light, which exits the lower surface of the light guide plate 42 from the inside of the light guide plate 42, back to the inside of the light guide plate 42. The reflector sheet 43 may be manufactured by coating a base material with a material having a high reflectance. For example, the reflector sheet 43 may be manufactured by coating a polymer having a high reflectance on a base material such as polyethylene terephthalate (PET).

The quantum dot sheet 90 may convert the light exiting the upper surface of the light guide plate 42 into white light. According to an embodiment, the quantum dot sheet 90 may include a fluorescent member including quantum dots and a barrier film for blocking exposure of the quantum dots to oxygen or moisture.

When a voltage is applied to a quantum dot, the quantum dot emits light by itself or absorbs light and emits light of a specific wavelength. The smaller the size of the quantum dots, the shorter the wavelength of light may be emitted, and the larger the size of the quantum dots, the longer wavelengths of light may be emitted. Light of various wavelengths from red light to blue light may be output by using quantum dots of various sizes. In other words, light having a natural color (white light) may be output using quantum dots of various sizes.

The optical sheets 50, 60 and 70 may refract or scatter light to increase the brightness of the display apparatus 1, widen the viewing angle, and improve color reproducibility.

According to an embodiment, the optical sheets 50, 60 and 70 may include the first prism sheet 50, the reflective polarizing sheet 60 disposed above the first prism sheet 50 to transmit one polarized light (i.e., first light having a first polarization) of the light emitted from the first prism sheet 50 and reflect the other one polarized light (i.e., second light having a second polarization), and the second prism sheet 70 disposed between the reflective polarizing sheet 60 and the liquid crystal panel 20 to control the transmission angle at which the light exiting the reflective polarizing sheet 60 is transmitted by the liquid crystal cell 22.

The first prism sheet 50 may improve the brightness of the display apparatus 1 by refracting and condensing the light emitted from the quantum dot sheet 90. The first prism sheet 50 may include a first base sheet 51 and a first-A prism pattern 52 (i.e., a first prism pattern) formed on an upper surface 51a of the first base sheet 51.

The first-A prism pattern 52 may be a pattern in which a ridge line 54 and a valley are repeated. That is, the first-A prism pattern 52 may be formed by adjacently arranging a plurality of first-A prisms 53 (i.e., a plurality of first prisms) having a substantially triangular cross section. As shown, e.g., in FIG. 3, the first-A prisms 53 may extend along a longitudinal direction (X direction) of the display apparatus 1 to condense light in a width direction (Y direction) of the display apparatus 1. A vertical angle 81A of the first-A prism 53 may have an acute angle to increase the light collection efficiency.

The reflective polarizing sheet 60 may transmit the light polarized in a direction parallel to the polarizing direction of the reflective polarizing sheet 60 among the lights emitted from the light emitting module 40 and reflect the light polarized in a direction different from the polarizing direction of the reflective polarizing sheet 60. The reflective polarizing sheet 60 may have a polarizing direction of the same direction as the polarizing direction of the lower polarizing sheet 36.

The light reflected from the reflective polarizing sheet 60 may be reused inside the display apparatus 1 to improve the brightness of the display apparatus 1. That is, a part of the lights reflected by the reflective polarizing sheet 60 may be transmitted back to the reflective polarizing sheet 60 by the light guide plate 42 or the reflective sheet 43 of the light emitting module 40. The polarization direction of light may change by repeating the above process, and the light may be transmitted by the reflective polarizing sheet 60 when the polarization direction of light becomes parallel to the polarization direction of the reflective polarizing sheet 60.

A double bright enhancement film (DBEF) may be employed as the reflective polarizing sheet 60.

The second prism sheet 70 may be disposed between the reflective polarizing sheet 60 and the liquid crystal panel 20 to control the transmission angle at which the light exiting the reflective polarizing sheet 60 is transmitted by the liquid crystal cell 22.

The second prism sheet 70 may be formed of a plurality of prism sheets laminated in the vertical direction. That is, the second prism sheet 70 may include a second-A prism sheet 80 (i.e., a third prism sheet) on a lower side thereof and a second-B prism sheet 85 (i.e., a fourth prism sheet) on an upper side thereof. However, unlike the present embodiment, only one of the second prism sheet 70 may be provided.

The second-A prism sheet 80 and the second-B prism sheet 85 may have the same structure.

The second-A prism sheet 80 may include a second-A base sheet 81 and a second-A prism pattern 82 formed on an upper surface 81a of the second-A base sheet 81.

The second-A prism pattern 82 may be a pattern in which a ridge line 84 and a valley are repeated. That is, the second-A prism pattern 82 may be formed by adjacently arranging a plurality of second-A prisms 83 having a substantially triangular cross section. The second-A prisms 83 may extend along the width direction (Y direction) of the display apparatus 1 to condense light in the longitudinal direction (X direction) of the display apparatus 1. A vertical angle 82A of the second-A prisms 83 may have an obtuse angle.

The second-B prism sheet 85 may include a second-B base sheet 86 and a second-B prism pattern 87 formed on an upper surface 86a of the second-B base sheet 86.

The second-B prism pattern 87 may be a pattern in which a ridge line 89 and a valley are repeated. That is, the second-B prism pattern 87 may be formed by adjacently arranging a plurality of second-B prisms 88 having a substantially triangular cross section. The second-B prisms 88 may extend along the width direction (Y direction) of the display apparatus 1 to condense light in the longitudinal direction (X direction) of the display apparatus 1. A vertical angle 82B of the second-B prism 88 may have an obtuse angle.

The second-A prism sheet 80 and the second-B prism sheet 85 may be spaced apart from each other by a predetermined distance, and an air layer may be formed therebetween.

Because the vertical angle 82A of the second-A prisms 83 and the vertical angle 82B of the second-B prisms 88 have an obtuse angle, it is advantageous in the manufacturing process of the second-A prisms 83 and the second-B prisms 88 and may collect the light on the liquid crystal cell 22 so as to have a more nearly vertical distribution.

With the above structure, the light may be condensed while traveling through the second-A prisms 83, the air layer, and the second-B prisms 88 in order. The transmission angle through which the light, which has been condensed while traveling through the second-A prisms 83, the air layer, and the second-B prisms 88 in order, is transmitted by the liquid crystal cell 22 may be 90 degrees or almost 90 degrees.

The second-A prism sheet 80 may be integrally formed with the reflective polarizing sheet 60 by being joined to an upper surface of the reflective polarizing sheet 60. However, unlike the present embodiment, the second-A prism sheet 80 and the reflective polarizing sheet 60 may be provided to be spaced apart from each other by a predetermined gap G (see, e.g., FIG. 6).

With the above structure, according to the present embodiment, the light emitted from the light emitting module 40 may be condensed through the first prism sheet 50 and reused through the reflective polarizing sheet 60 to improve the brightness.

Further, the transmission angle of light transmitting through the liquid crystal cell 22 through the second-A prism sheet 80 and the second-B prism sheet 85 having the vertexes of an obtuse angle is narrowed, so that the color reproducibility and image quality of the liquid crystal may be improved. In particular, deterioration in image quality at opposite side portions in the longitudinal direction of the liquid crystal panel 20 may be improved.

The light transmitting through the liquid crystal cell 22 is spread widely by the diffusion layer 34 formed on an upper portion of the liquid crystal cell 22 so that the viewing angle of the display apparatus 1 may be widened.

As a result, the display apparatus 1 may have an effect of securing a viewing angle while improving image quality.

FIG. 4 is a view illustrating a laminated structure of a display apparatus according to a embodiment. The same reference numerals are assigned to the same components as those in the above-described embodiment, and description thereof may be omitted.

Unlike the embodiment described above, the upper polarizing sheet 30 may not include the intermediate layer 33.

That is, the upper polarizing sheet 30 may be composed of the phase-difference layer 31, the polarizer layer 32, the diffusion layer 34, and the surface layer 35. Therefore, the configuration of the upper polarizing sheet 30 may be simplified and the thickness thereof may be reduced.

Figure 5:
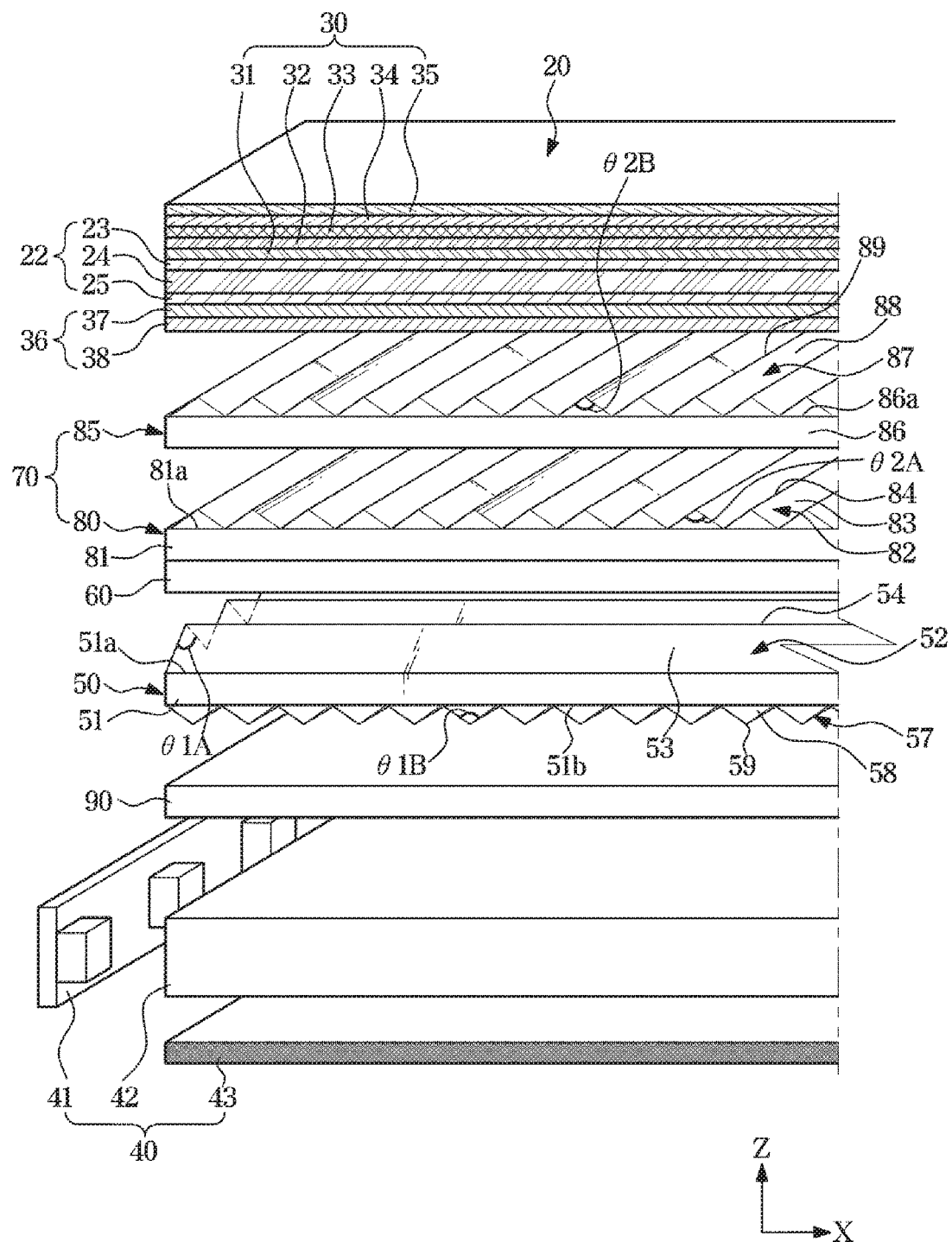
FIG. 5 is a view illustrating a laminated structure of a display apparatus according to an embodiment.

FIG. 5 is a view illustrating a laminated structure of a display apparatus according to a embodiment. The same reference numerals are assigned to the same components as those in the above-described embodiments, and description thereof may be omitted.

Unlike the embodiments described above, the first prism sheet 50 may be a double-sided prism sheet having a prism on both the upper and lower surfaces thereof.

That is, the first prism sheet 50 may include the first base sheet 51, the first-A prism pattern 52 formed on the upper surface 51a of the first base sheet 51, and the first-B prism pattern 57 (i.e., a second prism pattern) formed on a lower surface 51b of the first base sheet 51.

The first-A prism pattern 52 may be a pattern in which the ridge line 54 and the valley are repeated. That is, the first-A prism pattern 52 may be formed by adjacently arranging a plurality of the first-A prisms 53 having a substantially triangular cross section. The first-A prisms 53 may extend along the longitudinal direction (X direction) of the display apparatus 1 to condense light in the width direction (Y direction) of the display apparatus 1. The vertical angle 81A of the first-A prism 53 may have an acute angle to increase the light collection efficiency.

The first-B prism pattern 57 may be a pattern in which a ridge line 59 and a valley are repeated. That is, the first-B prism pattern 57 may be formed by adjacently arranging a plurality of a first-B prisms 58 (i.e., a plurality of second prisms) having a substantially triangular cross section. The first-B prisms 58 may extend along the width direction (Y direction) of the display apparatus 1 to condense light in the longitudinal direction (X direction) of the display apparatus 1. That is, the first-A prism 53 and the first-B prism 58 may be formed perpendicular to each other. A vertical angle θ1B of the first-B prism 58 may have an acute angle to increase the light collection efficiency.

With this structure, the brightness of the display apparatus 1 may be further improved.

Figure 6:
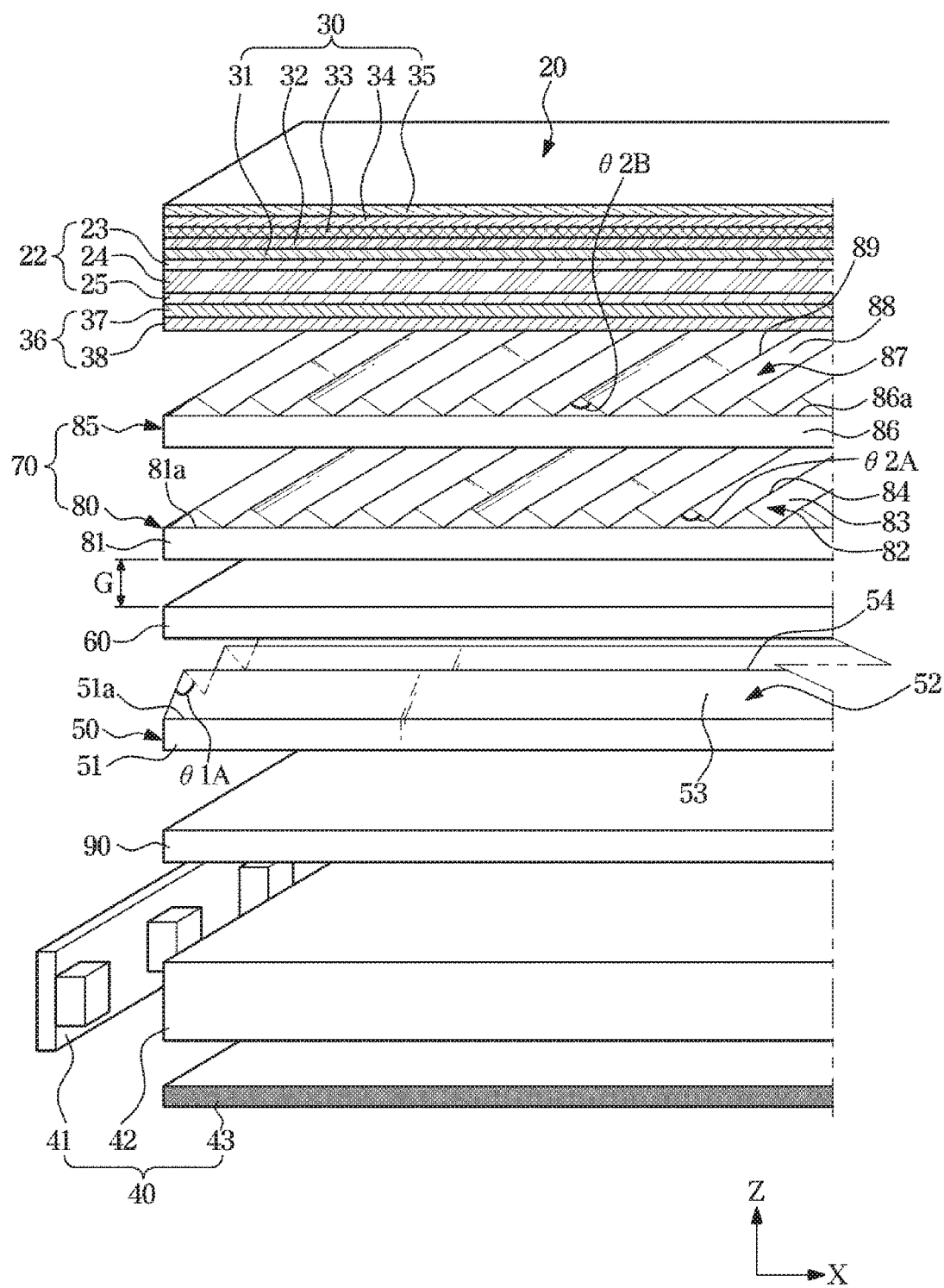
FIG. 6 is a view illustrating a laminated structure of a display apparatus according to an embodiment.

FIG. 6 is a view illustrating a laminated structure of a display apparatus according to a embodiment. The same reference numerals are assigned to the same components as those in the above-described embodiments, and description thereof may be omitted.

Unlike the embodiments described above, the second-A prism sheet 80 and the reflective polarizing sheet 60 may not be joined to each other. Further, the second-A prism sheet 80 and the reflective polarizing sheet 60 may be provided to be spaced apart from each other by the predetermined gap G.

Because the second-A prism sheet 80 and the reflective polarizing sheet 60 need not be joined to each other, the manufacturing process may be simplified and the replacement and repair of parts may be facilitated.

Figure 7:
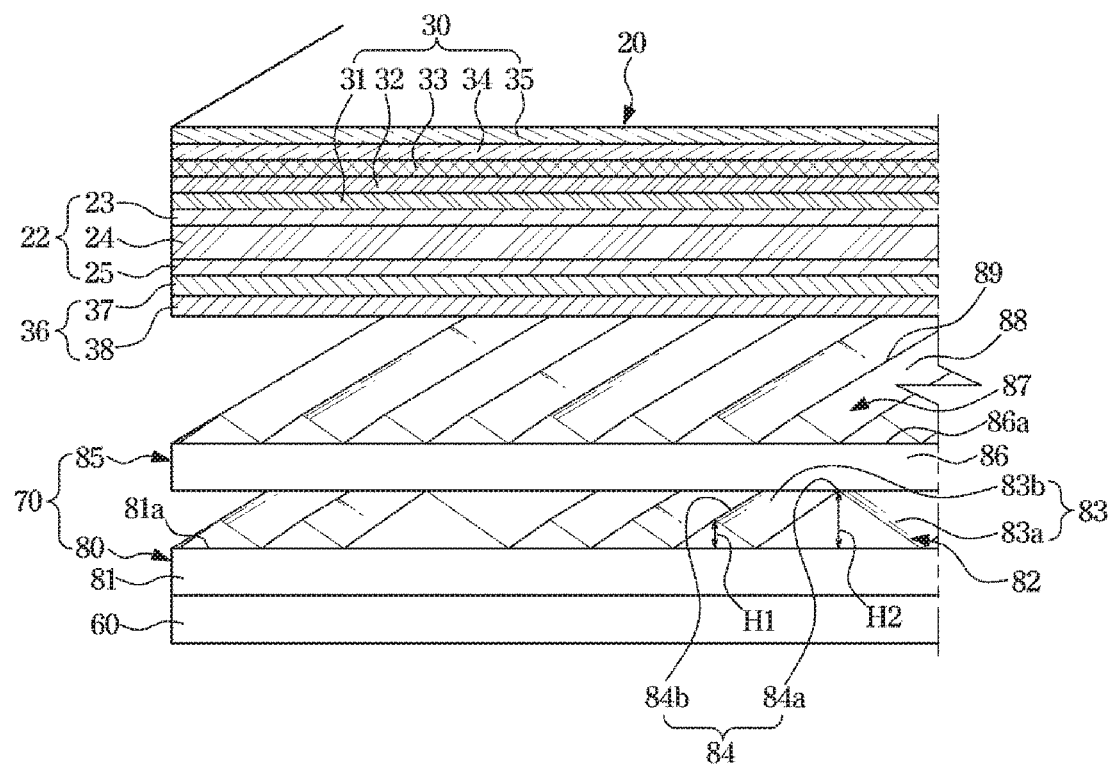
FIG. 7 is a view illustrating a laminated structure of a display apparatus according to an embodiment.

FIG. 7 is a view illustrating a laminated structure of a display apparatus according to a embodiment. The same reference numerals are assigned to the same components as those in the above-described embodiments, and description thereof may be omitted.

One of the plurality of second prism sheets 80 and 85 may include prisms having different heights from each other so that the plurality of second prism sheets 80 and 85 are joined to each other.

That is, the lower second-A prism sheet 80 may include prisms having different heights from each other.

For example, the second-A prisms 83 of the second-A prism sheet 80 may include a second-AA prism 83a (i.e., a fourth prism) and a second-AB prism 83b (i.e., a fifth prism) having a height lower than the second-AA prism 83a. A height H2 of the second-AA prism 83a may be higher than a height H1 of the second-AB prism 83b.

Therefore, a ridge line 84a of the second-AA prism 83a may be adhered to a lower surface of the second-B prism sheet 85, and a ridge line 83b of the second-AB prism 83b may be spaced apart from the lower surface of the second-B prism sheet 85 and may not be adhered thereto. As such, some of the second prisms 83 of the second-A prism sheet 80 are not adhered to the lower surface of the second-B prism sheet 85, so that the optical performance may not deteriorate greatly.

Figure 8:
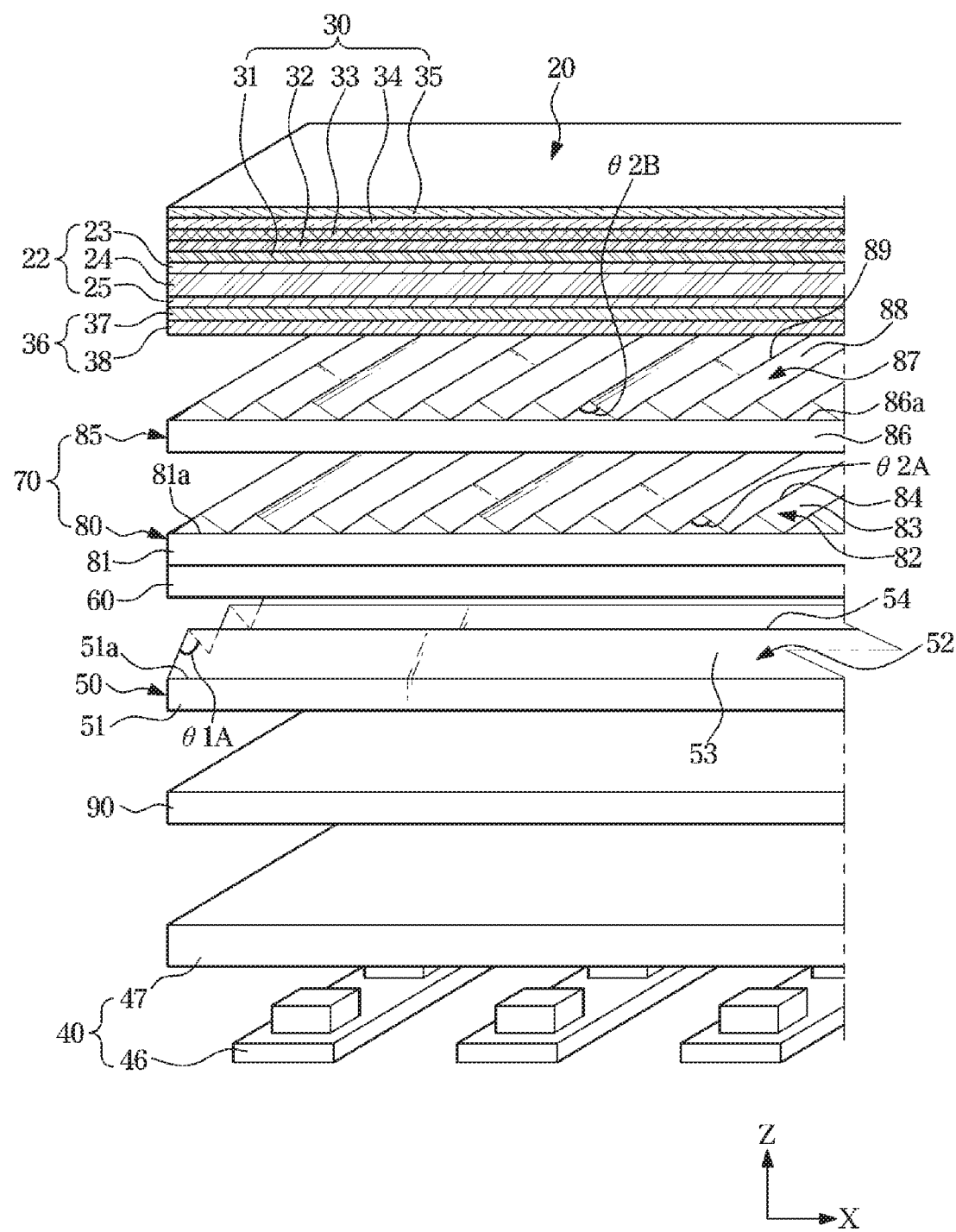
FIG. 8 is a view illustrating a laminated structure of a display apparatus according to an embodiment.

FIG. 8 is a view illustrating a laminated structure of a display apparatus according to a embodiment. The same reference numerals are assigned to the same components as those in the above-described embodiments, and description thereof may be omitted.

Unlike the embodiments described above, the light emitting module 40 may be a direct type in which the light source is positioned below the liquid crystal panel 20. The light emitting module 40 may include a light source 46 and a diffusion plate 47 that diffuses the light generated from the light source 46 to improve brightness and uniformity of light.

According to an aspect of one or more embodiments, because the transmission angle of light transmitting through a liquid crystal layer is controlled to be substantially perpendicular to the liquid crystal layer, the color reproducibility of a display apparatus can be improved.

According to an aspect of one or more embodiments, because light that has transmitted through the liquid crystal layer diffuses again above the liquid crystal layer, a viewing angle can be ensured.

Although the technical idea of the disclosure has been described above with reference to specific embodiments, the scope of rights of the disclosure is not limited to these embodiments. It will be understood by those skilled in the art that various changes in form and details may be made therein without departing from the spirit and scope of the disclosure as defined by the appended claims and their equivalents.

What is claimed is:

1. A display apparatus comprising:
   a light emitting module configured to emit light;
   a first prism sheet provided on the light emitting module;
   a reflective polarizing sheet provided on the first prism sheet, the reflective polarizing sheet being configured to transmit first light of the light exiting the first prism sheet and reflect second light of the light exiting the first prism sheet, the first light having a first polarization and the second light having a second polarization different from the first polarization;
   a second prism sheet provided on the reflective polarizing sheet and configured to receive the light transmitted by the reflective polarizing sheet, the second prism sheet comprising a plurality of second prism sheets laminated in a vertical direction; and
   a liquid crystal panel provided on the second prism sheet, the liquid crystal panel comprising a liquid crystal cell, a first polarizing sheet provided on a first side of the liquid crystal cell, and a second polarizing sheet provided between the second prism sheet and a second side of the liquid crystal cell opposite to the first side of the liquid crystal cell, wherein the second prism sheet is configured to control a transmission angle at which the light exiting the reflective polarizing sheet is transmitted by the liquid crystal cell.

2. The display apparatus according to claim 1, wherein the first polarizing sheet comprises a diffusion layer and a polarizer layer provided between the liquid crystal cell and the diffusion layer, the diffusion layer being configured to diffuse the light exiting the polarizer layer.

3. The display apparatus according to claim 1, wherein the first prism sheet comprises a first base sheet and a first prism pattern formed on a first surface of the first base sheet facing the reflective polarizing sheet.

4. The display apparatus according to claim 3, wherein the first prism pattern comprises a plurality of first prisms, and each first prism from among the plurality of first prisms has a triangular cross section and extends along a longitudinal direction of the display apparatus.

5. The display apparatus according to claim 3, wherein the first prism sheet further comprises a second prism pattern formed on a second surface of the first base sheet opposite to the first surface of the first base sheet.

6. The display apparatus according to claim 5, wherein the second prism pattern comprises a plurality of second prisms, and each second prism from among the plurality of second prisms has a triangular cross section and extends along a width direction of the display apparatus.

7. The display apparatus according to claim 1, wherein the second prism sheet comprises a second base sheet and a third prism pattern formed on a first surface of the second base sheet facing the liquid crystal panel.

8. The display apparatus according to claim 7, wherein the third prism pattern comprises a plurality of third prisms, and each third prism from among the plurality of third prisms has a triangular cross section and extends along a width direction of the display apparatus.

9. The display apparatus according to claim 7, wherein a vertical angle of the third prism pattern is an obtuse angle.

10. The display apparatus according to claim 1, wherein one of the plurality of second prism sheets comprises prisms having different heights from each other so that the plurality of second prism sheets are laminated together.

11. The display apparatus according to claim 10, wherein a first one of the plurality of second prism sheets is joined to a second one of the plurality of second prism sheets,
the first one of the plurality of second prism sheets comprises a first prism having a first height and a second prism having a second height lower than the first height, and
an end of the first prism is adhered to a surface of the second one of the plurality of second prism sheets and an end of the second prism is not adhered to the surface of the second one of the plurality of second prism sheets.

12. The display apparatus according to claim 1, wherein the second prism sheet is joined to a surface of the reflective polarizing sheet.

13. The display apparatus according to claim 1, further comprising:
a quantum dot sheet disposed between the light emitting module and the first prism sheet.

14. The display apparatus according to claim 1, wherein each second prism sheet from among the plurality of second prism sheets comprises a plurality of fourth prisms extending along a width direction of the display apparatus.

15. A display apparatus comprising:
a light emitting module configured to emit light;
a reflective polarizing sheet provided on the light emitting module, the reflective polarizing sheet being configured to transmit first light of the light emitted from the light emitting module and reflect second light emitted from the light emitting module, the first light having a first polarization and the second light having a second polarization different from the first polarization;
a prism sheet provided on the reflective polarizing sheet and configured to receive the light transmitted by the reflective polarizing sheet, the prism sheet comprising a plurality of prism sheets laminated in a vertical direction; and
a liquid crystal panel provided on the prism sheet, the liquid crystal panel comprising a liquid crystal cell, a first polarizing sheet provided on a first side the liquid crystal cell, and a second polarizing sheet provided between the prism sheet and a second side of the liquid crystal cell opposite to the first side of the liquid crystal cell,
wherein the prism sheet is configured to control a transmission angle at which the light exiting the reflective polarizing sheet is transmitted by the liquid crystal cell, and
wherein the first polarizing sheet comprises a diffusion layer configured to diffuse light exiting the liquid crystal cell.

16. The display apparatus according to claim 15, wherein the prism sheet comprises a base sheet and a prism pattern formed on a surface of the base sheet facing the reflective polarizing sheet.

17. The display apparatus according to claim 16, wherein the prism pattern comprises a plurality of prisms, and each prism from among the plurality of prisms has a triangular cross section and extends along a width direction of the display apparatus.

18. The display apparatus according to claim 16, wherein a vertical angle of the prism pattern is an obtuse angle.

* * * * *